Nov. 29, 1966 W. E. HANSON 3,287,958
TEST APPARATUS FOR TIME-INDICATING DEVICES
Filed Aug. 22, 1963 2 Sheets-Sheet 1

WALTER E.
HANSON
INVENTOR

BY *Donald R. Antonelli* ATTORNEY

Nov. 29, 1966 W. E. HANSON 3,287,958
TEST APPARATUS FOR TIME-INDICATING DEVICES
Filed Aug. 22, 1963 2 Sheets-Sheet 2
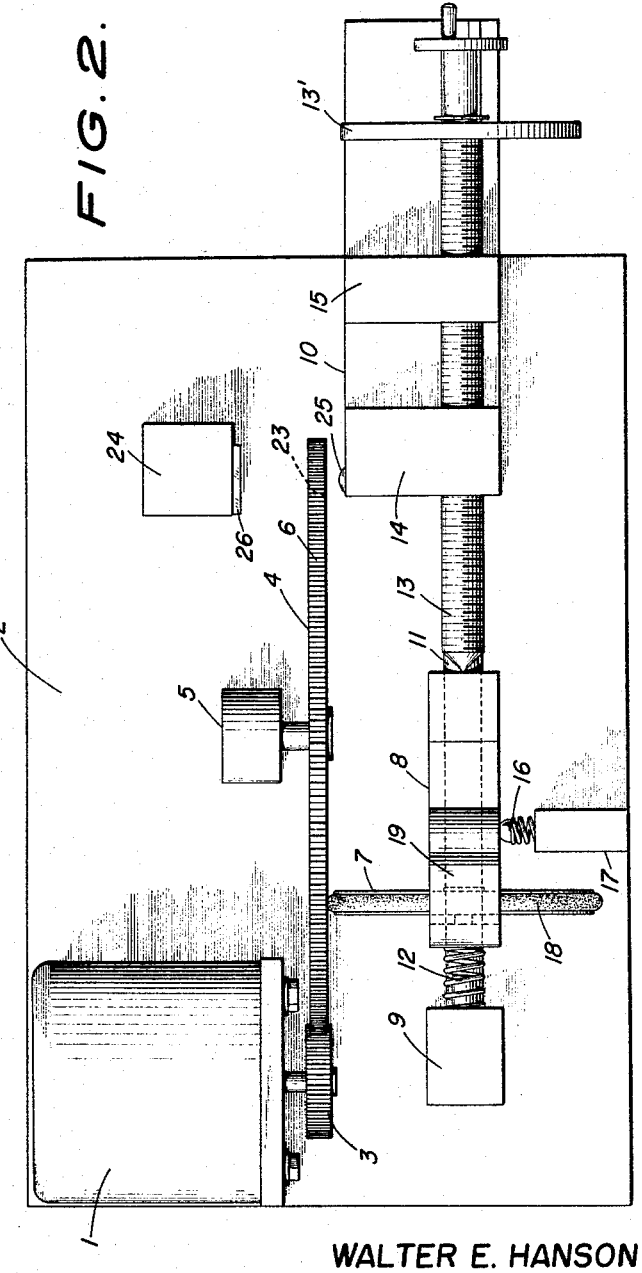
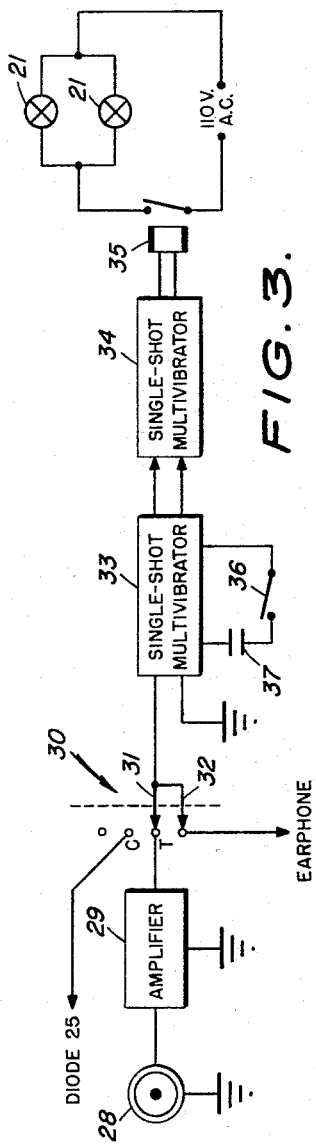
WALTER E. HANSON
INVENTOR
BY *Donald R. Antonelli*
ATTORNEY United States Patent Office 3,287,958
Patented Nov. 29, 1966

3,287,958
TEST APPARATUS FOR TIME-INDICATING
DEVICES
Walter E. Hanson, 5555 Rockburn Hill Road,
Elkridge, Md.
Filed Aug. 22, 1963, Ser. No. 303,845
10 Claims. (Cl. 73—6)

The present invention relates in general to testing apparatus and more particularly to a device using stroboscopic effects for testing the accuracy of watches and clocks.

The device most commonly used today for testing the accuracy of watches and clocks records the ticks of the watch or clock being tested on calibrated chart paper to provide an indication of the variations and irregularities in the running of the time piece. The chart paper is mounted on a drum rotating the five revolutions per second which corresponds to the number of ticks per second produced by a properly calibrated watch. The ticks of the time piece being tested are picked up by a microphone which converts them to electrical signals to be used to mark the rotating drum. If the rotation of the drum and the running of the watch or clock are in synchronism, a line parallel to the axis of the chart paper will be formed. However, if the watch or clock is not accurate, a skewed line will be formed on the chart, the angle and direction of the line depending upon the amount and direction of error.

One of the most serious drawbacks of the above-described device is the fact that considerable time is needed to produce a record from which the accuracy of the timepiece under test may be determined. In addition, if the timepiece under test is found to be in error, it must be removed from the testing device before it can be calibrated, and then a new record must be made to see if the adjustment made was sufficient. This results in a trial-and-error type of calibration which is hightly unsatisfactory. This prior art device is not only expensive but also contains no means of internal calibration to insure that no error exists in the testing device itself.

The instant invention provides a device which utilizes stroboscopic principles to provide an instantaneous indication of the accuracy of the timepiece being tested in both direction and amount. The invention further provides a means of internal calibration and permits adjustment of a timepiece while under test. The device according to the invention is simple, compact, inexpensive, and provides a degree of accuracy not heretofore attained by similar devices.

It is an object of the present invention to provide an apparatus for testing and calibrating watches and clocks which apparatus provides an instantaneous visual indication of the accuracy thereof.

It is another object of the instant invention to provide a testing apparatus which produces an instantaneous visual indication of the accuracy of a timepiece using stroboscopic principles.

It is a further object of the instant to provide an apparatus for presenting an instantaneous visual indication of both the direction and degree of error of a watch or clock.

It is still another object of the instant invention to provide an apparatus for testing and calibrating watches and clocks which apparatus contains a means for internal calibration.

It is still a further object of the present invention to provide an apparatus for testing and calibrating watches and clocks which permits the accurate calibration of these timepieces while under test.

It is also an object of the present invention to provide an apparatus of the type described which is simple, compact, inexpensive and provides a very high degree of accuracy.

By virtue of these and more specific features set forth with particularity in the claims annexed hereto, the invention provides extremely simple means for testing the accuracy of watches and clocks with far superior characteristics to those heretofore attainable with structures of much less simplicity. This will be more fully understood from the embodiment of the watch-testing apparatus illustrated by way of example in the accompanying drawings wherein:

FIGURE 2 is a top view of the embodiment shown in FIGURE 1; and

FIGURE 3 is a schematic diagram of the electrical control circuit to be used in the embodiment of FIGURE 1.

Figure 1:
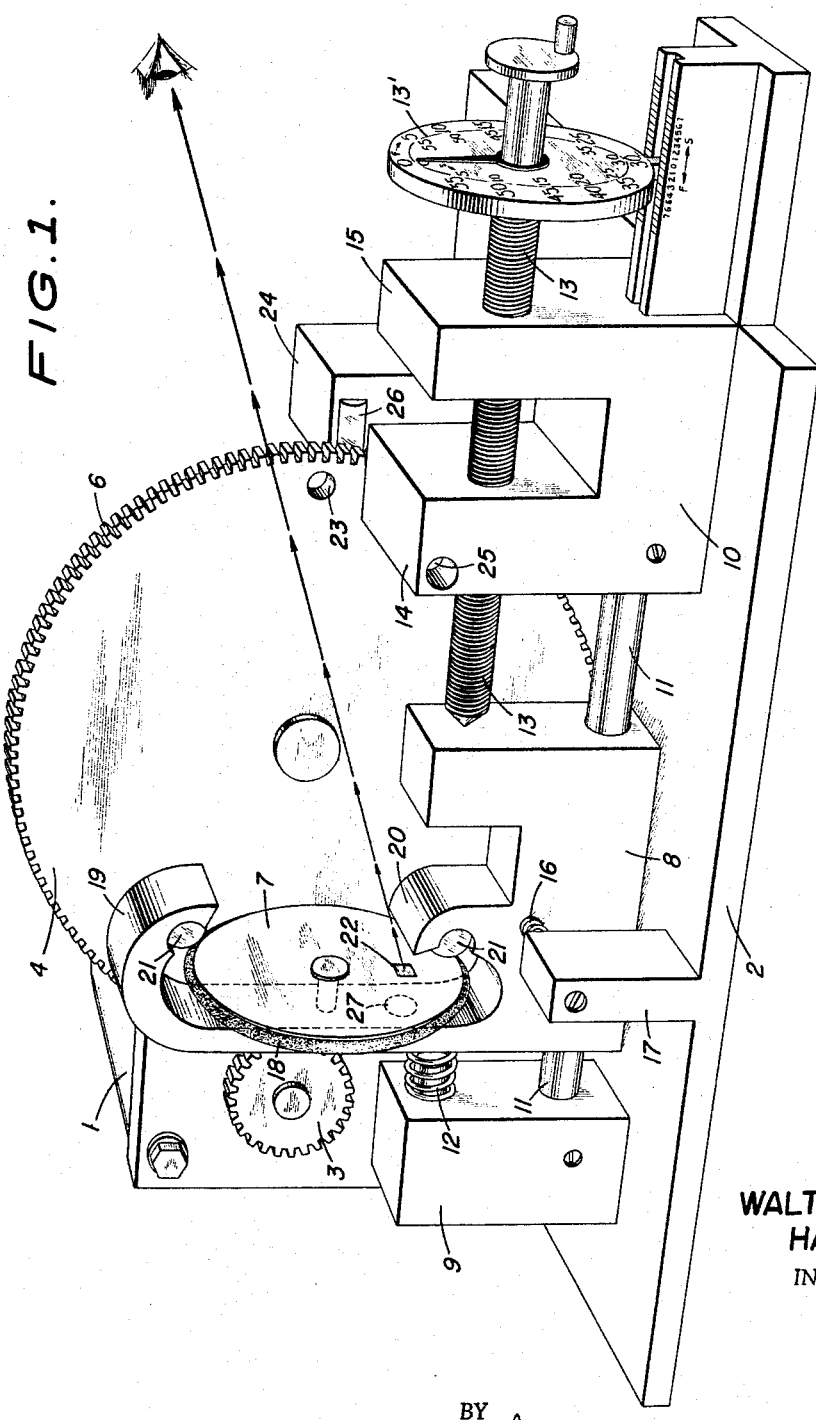
FIGURE 1 is a perspective drawing of one embodiment of the instant invention.

Referring to FIGURES 1 and 2 of the drawings, the numeral 1 designates a synchronous motor which can be driven by a normal 60-cycle alternating current power source. If extreme accuracy is required, the motor 1 can be driven by a power source synchronized with a piezoelectric crystal or a tuning fork. Such power systems are commercially available.

The motor 1 is mounted on a base plate 2 and drives via gear 3 a main timing disc 4 which is mounted for rotation on a mounting block 5 secured to base plate 2. The outer rim 6 of main timing disc 4 contains gear teeth which mesh with driving gear 3 providing positive and accurate driving of the disc 4. The relative size of the driving gear 3 and the timing disc 4 depends upon the speed of motor 1 and is designed such that disc 4 will rotate at a constant speed of 300 r.p.m.

A second disc 7 referred to as a strobe disc is mounted for rotation perpendicular to disc 4 on an L-shaped frame 8 which in turn is slidably supported between a pair of mounting blocks 9 and 10 on a horizontal shaft 11. The frame 8 is free to slide parallel to disc 4 but may be maintained in a fixed position by the oppositely exerted pressures of a spring and plunger combination 12 mounted in mounting block 9 and a precision rate adjusting screw 13 mounted in vertical legs 14 and 15 of mounted block 10. The adjusting screw 13 has attached at the outer end thereof a calibrated counter 13' calibrated to read seconds from left to right or right to left depending upon whether the device under test is running fast or slow.

Since rotation of frame 8 about horizontal shaft 11 is also possible, a spring plunger 16 having a ball bearing in its end is mounted on a mounting block 17 adjacent to the frame 8 so that the plunger 16 contacts the frame, forcing it toward timing disc 4. Due to the pressure exerted by the plunger 16, the strobe disc 7 will ride on the surface of timing disc 4. Therefore, in order to provide good contact between these discs, the strobe disc 7 is provided with a groove in its outer rim into which is snapped a rubber O-ring or tire 18. This rubber tire provides essentially positive contact between the two discs 4 and 7.

Frame 8 also contains a pair of extensions 19 and 20 located adjacent the visible face or disc 7, each of which contain a small neon lamp 21 capable of illuminating that face of disc 7. Located on the disc itself is an index or marker 22 which is positioned so as to be strobed by the lamps 21 in a manner to be described in connection with the operation of the invention.

The timing disc 4 contains an aperture 23 near its outer edge which passes between the vertical leg 14 of mounting block 10 and mounting block 24 in which are located, in registration with the aperture 23, a photodiode 25 and a neon light 26, respectively.

Looking to FIGURE 3 in which the electrical control system for the device of FIGURES 1 and 2 is shown, a microphone or crystal pick-up 28 for picking up watch ticks is connected to an amplifier 29 which is in turn connected to a three-position manual switch 30. The switch 30 contains four terminals, two of which, designated C and T, are connected to photodiode 25 and amplifier 29, respectively. Two parallelly connected sliders 31 and 32 contact the terminals in three positions so as to receive energy from terminal T alone, terminals C and T together, or terminal C alone.

The signal from sliders 31 and 32 is applied to a pair of serially connected single-shot multivibrators 33 and 34 which serve to actuate a relay 35. The multivibrator 33 contains a blanking switch 36 which when closed connects capacitor 37 to the timing circuit of the multivibrator altering the time constant thereof. This is desirable at times for reasons which will be made clearer as this discussion proceeds. The relay 35 controls the energization of the neon lamps 21 through selective application of power thereto from any suitable source of alternating current voltage.

In the operation of the device disclosed and illustrated, the motor 1 drives disc 4 at a constant 300 r.p.m. Since the escapement of a watch when properly calibrated operates exactly five times per second, the aperture 23 in disc 4 will pass between the neon lamp 26 and the photodiode 25 with the synchronism of a perfectly calibrated watch. Thus, with the neon lamp 26 illuminating the diode 25 with each revolution of disc 4, the diode 25 will generate a series of electrical pulses having a frequency of exactly five pulses per second.

With switch 30 in the uppermost position, slider 32 will contact terminal C and the pulses from diode 25 will actuate relay 35, thereby flashing strobe lights 21 at a rate of five flashes per second.

With strobe disc 7 riding on the face of timing disc 4, the disc 7 will rotate at a rate proportional to the distance between the center of disc 4 and the point of contact of disc 7 with disc 4. When the above-described distance is equal to the radius of disc 7, the two discs will rotate at the same speed; when disc 7 is closer to the center of disc 4, disc 7 will rotate slower than disc 4; and when disc 7 is further from the center of disc 4, disc 7 will rotate faster than disc 4. The position of disc 7 is easily adjusted by turning precision rate-adjusting screw 13.

With the output of photodiode 25 controlling the strobing of neon lamps 21, the position of disc 7 is adjusted by turning screw 13 until the mark or index 22 on disc 7 becomes stationary. When mark 22 is stationary, disc 7 will be rotating at exactly five times per second. Without moving the screw 13, the counter 13' is now set to zero. The watch-testing device according to the invention is now calibrated.

In order to test the accuracy of a watch or clock, the switch 30 is moved into the position where slider 31 contacts terminal T and the watch or clock to be tested is placed on the microphone 28. The ticks from the watch will operate relay 35 and the neon lamps 21 will flash in synchronism therewith.

If the watch under test is ticking at exactly five ticks per second as it should do if it is running accurately, the index mark 22 on disc 7 which is being strobed by lamps 21 will appear to be stationary. However, if the watch is running fast or slow, the index mark will move counterclockwise or clockwise, respectively, at a rate determined by the amount of error present. To determine that amount in seconds, the dial on counter 13' is moved thereby turning screw 13 and moving disc 7 until the index mark 22 appears to be stationary. The error in seconds or minutes can then be read from the calibrated dial of counter 13'.

If it is desired to adjust the watch using the invention, it is only necessary to have disc 7 in the calibrated position and adjust the speed of the watch until the index mark 22 appears stationary.

The accuracy of the invention can be further increased by moving switch 30 to the position where sliders 31 and 32 contact terminals C and T, respectively. Under this setup, both the output of diode 25 and the output of microphone 28 will control relay 35 and thus flash lamps 21. With this multiple strobing of disc 7, the index marker 22 will be seen in two different places on the disc 7, and their relative movement will be very easy to see.

It sometimes happens that the timepiece being tested is so mechanically weak that the odd ticks will be improperly spaced from the even-numbered ticks. Under these conditions, the index marker 22 will appear to jump back and forth on the face of disc 7, making accurate determination of the error very difficult. In order to eliminate this problem, the multivibrator 33 is provided with a capacitor 37 which may be switched into the timing circuit thereof by closing switch 36. The time delay of multivibrator 33 is then increased with respect to the delay of multivibrator 34, thereby effectively blanking out every other tick. The index marker 22 will then no longer jump back and forth since only all of the odd number or even number ticks will be controlling the strobing of lamps 21.

If it is not desired to determine the error of a timepiece by visual means, such an indication can be obtained through the use of a null meter. To accomplish this, the index marker 22 in disc 7 is replaced by a window and a photodiode 27 is provided in the vertical portion of L-shaped frame 8. The output of photodiodes 27 and 26 are then applied to a standard balanced diode bridge circuit containing a null meter. With the strobe lights 21 flashing in synchronism with the ticking of the timepiece under test, the signals generated by diode 27 due to the light passing through window 22 will be in synchronism with the output of diode 25 only if the watch is running accurately, and only under these conditions will a null be read on the null meter.

It should be evident from the foregoing specification that the invention as described in connection with the specific embodiment shown herein for illustration is susceptible of different variations and modifications differing from that illustrated and coming within the broad scope and spirit of the invention as defined in the appended claims.

I claim:

1. A system for testing and calibrating time-indicating devices and especially clocks and watches comprising a timing disc mounted for rotation, driving means for driving said timing disc at a constant predetermined speed, a strobe disc operatively associated with said timing disc and mounted for rotation thereby, a marker located on the face of said strobe disc, means positioned adjacent said strobe disc for illuminating the face thereof, means for energizing said illuminating means, control means for connecting said energizing means to said illuminating means in response to and in synchronism with the ticks of the time-indicating device under test and calibrated means operatively associated with said strobe disc for providing an indication of the relationship between said timing disc and said strobe disc when said marker is made to appear stationary while being strobed by said illuminating means, said calibrated means including means for varying the speed of said strobe disc in relation to said timing disc to effect calibration thereof.

2. A system as defined in claim 1, wherein said control means includes a transducer means for converting the ticks of said indicating device to electrical pulses, a pair of multivibrators connected to said transducer means for shaping and controlling said pulses and a relay means for selectively connecting said illuminating means to a source of energizing power in response to the output pulses from said multivibrators.

3. A system as defined in claim 2 and further including a means associated with one of said multivibrators for blanking every other pulse applied thereto.

4. A system as defined in claim 1 and further comprising a calibrating means associated with said timing disc for producing a plurality of electrical pulses equal in frequency to the speed of rotation of said timing disc, and means associated with said control means for rendering said control means responsive solely to said electrical pulses.

5. A system as defined in claim 4, wherein said calibrating means includes a neon light and a photodiode in axial alignment with an aperture in said timing disc.

6. A system as defined in claim 4, wherein said means for rendering said control means responsive solely to said electrical pulses is also capable of rendering said control means simultaneously responsive to said electrical pulses and the ticks of the time-indicating device under test.

7. A system as defined in claim 1, wherein said timing disc and said strobe disc are mounted perpendicular to one another with the rim of said strobe disc in contact with the face of said timing disc such that said strobe disc is driven by said timing disc at a speed proportional to the distance between the point of contact of said strobe disc on said timing disc and the center of said timing disc.

8. A system as defined in claim 7, wherein said calibrated means includes a precision screw means associated with said strobe disc for providing movement of said strobe disc so as to vary the point of contact of said strobe disc on the face of said timing disc.

9. A system for testing and calibrating time-indicating devices and especially clocks and watches comprising a first disc and means for driving said disc at a constant predetermined speed, a second disc having a marker on the face thereof and mounted for rotation at a variable speed by said first disc, means for periodically illuminating said marker in response to and in synchronism with the ticks of the time-indicating device under test, means for altering the relationship of said discs so as to vary the speed of said second disc, and calibrated means for indicating the extent of change of said altering means necessary to make said marker appear stationary when strobed by said illuminating means to thereby determine the degree of inaccuracy of said time-indicating device.

10. A system for testing and calibrating time-indicating devices and especially clocks and watches comprising a timing disc mounted for rotation, driving means for driving said timing disc at a constant predetermined speed, a timing disc and a strobe disc mounted perpendicular to one another with the rim of said strobe disc in contact with the face of said timing disc such that said strobe disc is driven by said timing disc at a speed proportional to the distance between the point of contact of said strobe disc on said timing disc and the center of said timing disc, a marker located on the face of sad strobe disc, means positioned adjacent said strobe disc for illuminating the face thereof, calibrating means associated with said timing disc for producing a plurality of electrical pulses equal in frequency to the speed of rotation of said timing disc, transducer means for converting the ticks of said time-indicating device in to electrical pulses, means for energizing said illuminating means, control means for selectively connecting said energizing means to said illuminating means in response to and in synchronism with the electrical pulses derived from said calibrating means and said transducer means, and calibrated means for providing an indication of the relationship between said timing disc and said strobe disc including a precison screw means associated with said strobe disc for providing movement of said strobe disc so as to vary the point of contact of said strobe disc on the face of said timing disc.

References Cited by the Examiner
UNITED STATES PATENTS

| | | | |
|---|---|---|---|
| 2,058,616 | 10/1936 | Norrman | 73—6 |
| 2,398,249 | 4/1946 | Richardson | 73—6 |

LOUIS R. PRINCE, *Primary Examiner.*

S. CLEMENT SWISHER, *Assistant Examiner.*